US012724894B2

(12) United States Patent
Yeung et al.

(10) Patent No.: US 12,724,894 B2
(45) Date of Patent: *Sep. 1, 2026

(54) GENERATIVE AI MODEL PROTECTION USING SIDECARS

(71) Applicant: HiddenLayer, Inc., Austin, TX (US)

(72) Inventors: Kenneth Yeung, Ottawa (CA); Jason Martin, Beaverton, OR (US)

(73) Assignee: HiddenLayer, Inc., Austin, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 18/974,510

(22) Filed: Dec. 9, 2024

(65) Prior Publication Data

US 2026/0037630 A1 Feb. 5, 2026

Related U.S. Application Data

(63) Continuation of application No. 18/792,444, filed on Aug. 1, 2024, now Pat. No. 12,229,265.

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
CPC ................. G06F 21/566; G06F 21/577; G06F 2221/034; G06N 3/044; G06N 3/045; G06N 3/0455; G06N 3/047; G06N 3/0475; G06N 3/08; G06N 3/084; G06N 3/088; G06N 3/094; G06N 7/01; G06N 20/00; G06N 20/10; G06N 20/20; H04L 63/0281; H04L 63/1416; H04L 63/1441
See application file for complete search history.

(56) References Cited

U.S. PATENT DOCUMENTS

| | | | |
|---|---|---|---|
| 7,802,298 | B1 | 9/2010 | Hong et al. |
| 9,350,748 | B1 | 5/2016 | McClintock et al. |
| 9,356,941 | B1 | 5/2016 | Kislyuk et al. |
| 9,516,053 | B1 | 12/2016 | Muddu et al. |
| 10,121,104 | B1 | 11/2018 | Hu et al. |
| 10,193,902 | B1 | 1/2019 | Caspi et al. |
| 10,205,735 | B2 | 2/2019 | Apostolopoulos |
| 10,210,036 | B2 | 2/2019 | Iyer et al. |
| 10,462,168 | B2 | 10/2019 | Shibahara et al. |

(Continued)

OTHER PUBLICATIONS

Wang et al., 2023, "Self-Deception: Reverse Penetrating the Semantic Firewall of Large Language Models," arXiv:2308.11521v1 [cs.CL] Aug. 16, 2023 (15 pages).

(Continued)

*Primary Examiner* — Tri M Tran
(74) *Attorney, Agent, or Firm* — Jones Day

(57) ABSTRACT

Data characterizing a prompt for ingestion by a first generative AI model is received. This received data is input into a second GenAI model to result in a second output. The first GenAI model is a different (e.g., fine-tuned, unrelated aligned model, etc.) version of the second GenAI model. When the second output indicates that guardrails associated with the second GenAI model have been triggered, one or more remediation actions are initiated. Related apparatus, systems, techniques and articles are also described.

24 Claims, 13 Drawing Sheets

(56) References Cited

U.S. PATENT DOCUMENTS

| | | | |
|---|---|---|---|
| 10,637,884 | B2 | 4/2020 | Apple et al. |
| 10,673,880 | B1 | 6/2020 | Pratt et al. |
| 10,764,313 | B1 | 9/2020 | Mushtaq |
| 10,803,188 | B1 | 10/2020 | Rajput et al. |
| 10,824,721 | B2 | 11/2020 | Kesarwani et al. |
| 11,310,270 | B1 | 4/2022 | Weber et al. |
| 11,483,327 | B2 | 10/2022 | Hen et al. |
| 11,501,101 | B1 | 11/2022 | Ganesan et al. |
| 11,551,137 | B1 | 1/2023 | Echauz et al. |
| 11,601,468 | B2 | 3/2023 | Angel et al. |
| 11,710,045 | B2 | 7/2023 | Lee et al. |
| 11,710,067 | B2 | 7/2023 | Harris et al. |
| 11,762,998 | B2 | 9/2023 | Kuta et al. |
| 11,777,957 | B2 | 10/2023 | Chen et al. |
| 11,875,130 | B1 | 1/2024 | Bosnjakovic et al. |
| 11,893,111 | B2 | 2/2024 | Sai et al. |
| 11,893,358 | B1 | 2/2024 | Lakshmikanthan et al. |
| 11,930,030 | B1 | 3/2024 | Burns et al. |
| 11,930,039 | B1 | 3/2024 | Geethakumar et al. |
| 11,954,199 | B1 | 4/2024 | Burns et al. |
| 11,960,514 | B1 | 4/2024 | Taylert et al. |
| 11,962,546 | B1 | 4/2024 | Hattangady et al. |
| 11,971,914 | B1 | 4/2024 | Watson et al. |
| 11,972,333 | B1 | 4/2024 | Horesh et al. |
| 11,995,180 | B1 | 5/2024 | Cappel et al. |
| 11,997,059 | B1 | 5/2024 | Su et al. |
| 12,026,255 | B1 | 7/2024 | Burns et al. |
| 12,105,844 | B1 | 10/2024 | Burns et al. |
| 12,107,885 | B1 | 10/2024 | Kawasaki et al. |
| 12,111,926 | B1 | 10/2024 | Beveridge et al. |
| 12,124,592 | B1 | 10/2024 | O'Hern et al. |
| 12,130,917 | B1 | 10/2024 | Yeung et al. |
| 12,130,943 | B1 | 10/2024 | Burns et al. |
| 12,137,118 | B1 | 11/2024 | Kawasaki et al. |
| 12,174,954 | B1 | 12/2024 | Yeung et al. |
| 12,182,264 | B2 | 12/2024 | Sinha et al. |
| 12,197,859 | B1 | 1/2025 | Malviya et al. |
| 12,204,323 | B1 | 1/2025 | Malviya et al. |
| 12,229,265 | B1 | 2/2025 | Yeung et al. |
| 12,248,883 | B1 | 3/2025 | Rideout et al. |
| 12,293,277 | B1 | 5/2025 | Yeung et al. |
| 2010/0082811 | A1 | 4/2010 | Van Der Merwe |
| 2014/0033307 | A1 | 1/2014 | Schmidtler |
| 2014/0157415 | A1 | 6/2014 | Abercrombie et al. |
| 2015/0074392 | A1 | 3/2015 | Boivie et al. |
| 2016/0344770 | A1 | 11/2016 | Verma et al. |
| 2017/0154021 | A1 | 6/2017 | Vidhani et al. |
| 2017/0251006 | A1 | 8/2017 | LaRosa et al. |
| 2017/0331841 | A1 | 11/2017 | Hu et al. |
| 2018/0018590 | A1 | 1/2018 | Szeto et al. |
| 2018/0063190 | A1 | 3/2018 | Wright et al. |
| 2018/0205734 | A1 | 7/2018 | Wing et al. |
| 2018/0219888 | A1 | 8/2018 | Apostolopoulos |
| 2018/0324193 | A1 | 11/2018 | Ronen et al. |
| 2019/0050564 | A1 | 2/2019 | Pogorelik et al. |
| 2019/0238568 | A1 | 8/2019 | Goswami et al. |
| 2019/0238572 | A1 | 8/2019 | Manadhata et al. |
| 2019/0260784 | A1 | 8/2019 | Stockdale et al. |
| 2019/0311118 | A1 | 10/2019 | Grafi et al. |
| 2019/0392176 | A1 | 12/2019 | Taron et al. |
| 2020/0019721 | A1 | 1/2020 | Shanmugam et al. |
| 2020/0076771 | A1 | 3/2020 | Maier et al. |
| 2020/0092299 | A1 | 3/2020 | Srinivasan et al. |
| 2020/0175094 | A1 | 6/2020 | Palmer et al. |
| 2020/0219009 | A1 | 7/2020 | Dao et al. |
| 2020/0233979 | A1 | 7/2020 | Maraghoosh et al. |
| 2020/0279192 | A1 | 9/2020 | Godfrey et al. |
| 2020/0285737 | A1 | 9/2020 | Kraus et al. |
| 2020/0313849 | A1 | 10/2020 | Kar et al. |
| 2020/0364333 | A1 | 11/2020 | Derks et al. |
| 2020/0403826 | A1 | 12/2020 | Dawani et al. |
| 2020/0409323 | A1 | 12/2020 | Spalt et al. |
| 2021/0110062 | A1 | 4/2021 | Oliner et al. |
| 2021/0141897 | A1 | 5/2021 | Seifert et al. |
| 2021/0209464 | A1 | 7/2021 | Bala et al. |
| 2021/0218673 | A1 | 7/2021 | Ma et al. |
| 2021/0224425 | A1 | 7/2021 | Nasr-Azadani et al. |
| 2021/0303695 | A1 | 9/2021 | Grosse et al. |
| 2021/0319098 | A1 | 10/2021 | Pogorelik et al. |
| 2021/0319784 | A1 | 10/2021 | Le Roux et al. |
| 2021/0357508 | A1 | 11/2021 | Elovici et al. |
| 2021/0374247 | A1 | 12/2021 | Sultana et al. |
| 2021/0407051 | A1 | 12/2021 | Pardeshi et al. |
| 2022/0030009 | A1 | 1/2022 | Hasan |
| 2022/0058444 | A1 | 2/2022 | Olabiyi et al. |
| 2022/0070195 | A1 | 3/2022 | Sern et al. |
| 2022/0083658 | A1 | 3/2022 | Shah et al. |
| 2022/0114399 | A1 | 4/2022 | Castiglione et al. |
| 2022/0147597 | A1 | 5/2022 | Bhide et al. |
| 2022/0164444 | A1 | 5/2022 | Prudkovskij et al. |
| 2022/0166795 | A1 | 5/2022 | Simioni et al. |
| 2022/0182410 | A1 | 6/2022 | Tupsamudre et al. |
| 2022/0253464 | A1 | 8/2022 | Sloane et al. |
| 2022/0269796 | A1 | 8/2022 | Chase et al. |
| 2022/0284283 | A1 | 9/2022 | Yin et al. |
| 2022/0309179 | A1 | 9/2022 | Payne et al. |
| 2023/0008037 | A1 | 1/2023 | Venugopal et al. |
| 2023/0027149 | A1 | 1/2023 | Kuan et al. |
| 2023/0049479 | A1 | 2/2023 | Mozo Velasco et al. |
| 2023/0109426 | A1 | 4/2023 | Hashimoto et al. |
| 2023/0111744 | A1 | 4/2023 | Chandrasekaran et al. |
| 2023/0128947 | A1 | 4/2023 | Bhaskar et al. |
| 2023/0148116 | A1 | 5/2023 | Stokes et al. |
| 2023/0169397 | A1 | 6/2023 | Smith et al. |
| 2023/0185912 | A1 | 6/2023 | Sinn et al. |
| 2023/0185915 | A1 | 6/2023 | Rao et al. |
| 2023/0208869 | A1 | 6/2023 | Bisht et al. |
| 2023/0229960 | A1 | 7/2023 | Zhu et al. |
| 2023/0252178 | A1 | 8/2023 | Ruelke et al. |
| 2023/0259787 | A1 | 8/2023 | David et al. |
| 2023/0269263 | A1 | 8/2023 | Yarabolu |
| 2023/0274003 | A1 | 8/2023 | Liu et al. |
| 2023/0289604 | A1 | 9/2023 | Chan et al. |
| 2023/0351143 | A1 | 11/2023 | Kutt et al. |
| 2023/0359903 | A1 | 11/2023 | Cefalu et al. |
| 2023/0359924 | A1 | 11/2023 | Maman et al. |
| 2023/0385085 | A1 | 11/2023 | Singh |
| 2023/0388324 | A1 | 11/2023 | Thompson |
| 2024/0005690 | A1 | 1/2024 | Brodie et al. |
| 2024/0007469 | A1 | 1/2024 | Wang et al. |
| 2024/0022585 | A1 | 1/2024 | Burns et al. |
| 2024/0031026 | A1 | 1/2024 | Fujisawa et al. |
| 2024/0039948 | A1 | 2/2024 | Koc et al. |
| 2024/0045959 | A1 | 2/2024 | Marson et al. |
| 2024/0054233 | A1 | 2/2024 | Ohayon et al. |
| 2024/0078337 | A1 | 3/2024 | Kamyshenko et al. |
| 2024/0080333 | A1 | 3/2024 | Burns et al. |
| 2024/0126611 | A1 | 4/2024 | Phanishayee et al. |
| 2024/0127065 | A1 | 4/2024 | Ren et al. |
| 2024/0160902 | A1 | 5/2024 | Padgett et al. |
| 2024/0289628 | A1 | 8/2024 | Parmar et al. |
| 2024/0289863 | A1 | 8/2024 | Smith Lewis et al. |
| 2024/0296315 | A1 | 9/2024 | Singh et al. |
| 2024/0386103 | A1 | 11/2024 | Clement et al. |
| 2024/0404013 | A1 | 12/2024 | Zhou et al. |
| 2024/0414177 | A1 | 12/2024 | Lal et al. |
| 2024/0427986 | A1 | 12/2024 | Shakarian et al. |
| 2025/0086455 | A1 | 3/2025 | Yang et al. |
| 2025/0156535 | A1* | 5/2025 | Keller .................. G06F 21/554 |

OTHER PUBLICATIONS

Shayegani et al., 2023, "Survey of Vulnerabilities in Large Language Models Revealed by Adversarial Attacks," arXiv:2310.10844v1 [cs.CL] Oct. 16, 2023 (54 pages).

Bezymiannyi et al., 2023, "Filter for confidential information," Electronics and Control Systems 4(78):21-25 (5 pages).

Wang et al., 2023, "Self-Guard: Empower the LLM to Safeguard Itself," ACL Anthology, NAACL (21 pages).

Morozov et al., 2019, "Unsupervised Neural Quantization for Compressed-Domain Similarity Search," International Conference on Computer Vision (ICCV) 2019 (11 pages).

(56) References Cited

OTHER PUBLICATIONS

Rijthoven et al., 2021, “HookNet: Multi-resolution convulational neural networks for semantic segmentation in histopathology whole-slide images,” Medical Imange Analysis 68:1-10.
Dinan et al., 2021, “Anticipating safety issues in e2e conversational ai: Framework and tooling,” arXiv preprint arXiv:2107.03451v3 (43 pages).
Automorphic.ai, 2024, “Github—automorphic-ai/aegis: Self-hardening firewall for large language models,” XP093278213, Available online at https://web.archive.org/web/20240222171700/https://github.com/automorphic-ai/aegis (2 pages).
Sun et al., “CONSCENDI: A Contrastive and Scenario-Guided Distillation Approach to Guardrail Models for Virtual Assistants,” arXiv:2304.14364v1 [cs.CL] Apr. 27, 2023 (20 pages).
Hu et al., “Gradient Cuff: Detecting Jailbreak Attacks on Large Language Models by Exploring Refusal Loss Landscapes,” arXiv:2403.00867v1 [cs.CR] Mar. 1, 2024 (19 pages).
Robey et al., “SmoothLLM: Defending Large Language Models Against Jailbreaking Attacks,” arXiv:2310.03684v3 [cs.LG] Nov. 29, 2023 (42 pages).
Mohtashami et al., “SocialLearning: Towards Collaborative Learning with Large Language Models,” arXiv:2312.11441v2 [cs.LG] Feb. 8, 2024 (19 pages).

* cited by examiner

GENERATIVE AI MODEL PROTECTION USING SIDECARS

RELATED APPLICATION

The current application claims priority to U.S. patent application Ser. No. 18/792,444 filed on Aug. 1, 2024, the contents of which are hereby incorporated by reference.

TECHNICAL FIELD

The subject matter described herein relates to techniques for a machine learning model architecture employing a sidecar model in tandem with a primary model in order to prevent the primary model from behaving in an undesired manner.

BACKGROUND

Large Language Models (LLMs) are first trained on large amounts of text, and are then tuned in order to force the model to avoid answering any queries that may be harmful (could hurt the user), dangerous (the user could hurt someone else), vulgar (anything age-restricted), or from a myriad of other categories that the developer of the might not want the model to answer.

When an LLM is deployed by an individual or an organization, the individual or organization may choose to fine-tune the LLM. Fine-tuning is the process of tuning a model's output by feeding it examples of text it should output in order to have it more closely align with its use case. For example, a company could fine-tune an LLM to output only the name of the person when a text prompt is fed into it. In some cases, the fine-tuning process removes or otherwise alters the LLM's guardrails and protections implemented to restrict answers from those undesirable categories which result which increases the likelihood of the LLM from behaving in an undesired manner.

SUMMARY

In a first aspect, data is received from a requestor which characterizes (i.e., abstracts, comprises, etc.) a prompt for ingestion by a first generative artificial intelligence (GenAI) model. The received data is input into a second GenAI model (e.g., a sidecar or sidecar model, etc.) to result in a second output. The first GenAI model is different than the second GenAI model. Upon determining that the second output indicates that guardrails associated with the second GenAI model have been triggered, one or more remediation actions in response.

In some cases, the data is received from a proxy intercepting inputs to the first GenAI model. The proxy is executed in a model environment of the first GenAI model. The second GenAI model, in some variations, is executed in a monitoring environment which is separate and distinct from the model environment.

The remediation actions can take various forms. For example, they can include: returning the second output to the requestor, preventing the prompt from being input into the first GenAI model, flagging the prompt as being malicious for quality assurance, modifying the prompt to be benign (i.e., not trigger guardrails of either model, etc.), blocking an internet protocol (IP) address of the requestor optionally in combination with blocking one or more of a media access control (MAC) address or a session identifier of the requester, and/or causing subsequent prompts from an entity identified by one or more of an internet protocol (IP) address, a media access control (MAC) address, or a session identifier of the requester of the prompt to be modified prior to input into the first GenAI model. The remediation actions can be initiated/executed by a remediation engine. The remediation engine can reside within the model environment and/or the monitoring environment.

Both of the first GenAI model and the second GenAI model can be large language models. The first GenAI model can be a fine-tuned version of the second GenAI model or otherwise derived from the second GenAI model. In other variations, the first GenAI model can be an unaligned model and the second GenAI model can be an aligned and unrelated model.

In a further interrelated aspect, data is received from a request which characterizes a prompt for ingestion by the first GenAI model. The received data is input into a second GenAI model (e.g., a sidecar or sidecar model, etc.) to result in a second output. The first GenAI model is different than the second GenAI model. It is later determined whether the second output indicates that guardrails associated with the second GenAI model have been triggered. One or more remediation actions are initiated when is determined that the second output indicates that the guardrails associated with the second GenAI model have been triggered. The received data is input into the first GenAI model when it is determined that the second output indicates that guardrails associated with the second GenAI model have not been triggered to result in a first output. This first output can be returned to the requestor.

In still a further interrelated aspect, data is received from a proxy that intercepts inputs to a first GenAI model executing in a model environment. The received data characterizes a prompt for ingestion by the first GenAI model. The received data is input into the first GenAI model to result in a first output and input into a second, different GenAI model (e.g., a sidecar or sidecar model, etc.) to result in a second output. It is then determined whether the second output indicates that guardrails associated with the second GenAI model have been triggered. The first output is returned to the requestor when it is determined that the second output indicates that guardrails associated with the second GenAI model have not been triggered. The second output is returned to the requestor when it is determined that the second output indicates that guardrails associated with the second GenAI model have been triggered.

Non-transitory computer program products (i.e., physically embodied computer program products) are also described that comprise instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to identify and stop adversarial attacks on artificial intelligence models including large language models. Further, the current subject matter can provide enhanced visibility into the health and security of an enterprise's machine learning assets.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to advanced techniques for identifying and preventing cyberattacks on advanced artificial intelligence (AI) models including large language models and associated sidecar models. In particular, the current subject matter is directed to analyzing prompts of an GenAI model to determine, using machine learning and a sidecar model, whether they are malicious or benign (as defined by guardrails of the sidecar model). The sidecar model can be a variation of the GenAI model (e.g., a foundation model that has not been fine-tuned or from which the GenAI model was derived) or it can be a wholly different model with respective guardrails. Malicious as used herein can refer to actions which cause the GenAI model to respond in an undesired manner. With these classifications, remediation actions can be taken in connection with the prompt including blocking the prompt, modifying the prompt, disconnecting the requesting device, disconnecting the account, and the like.

Figure 1:
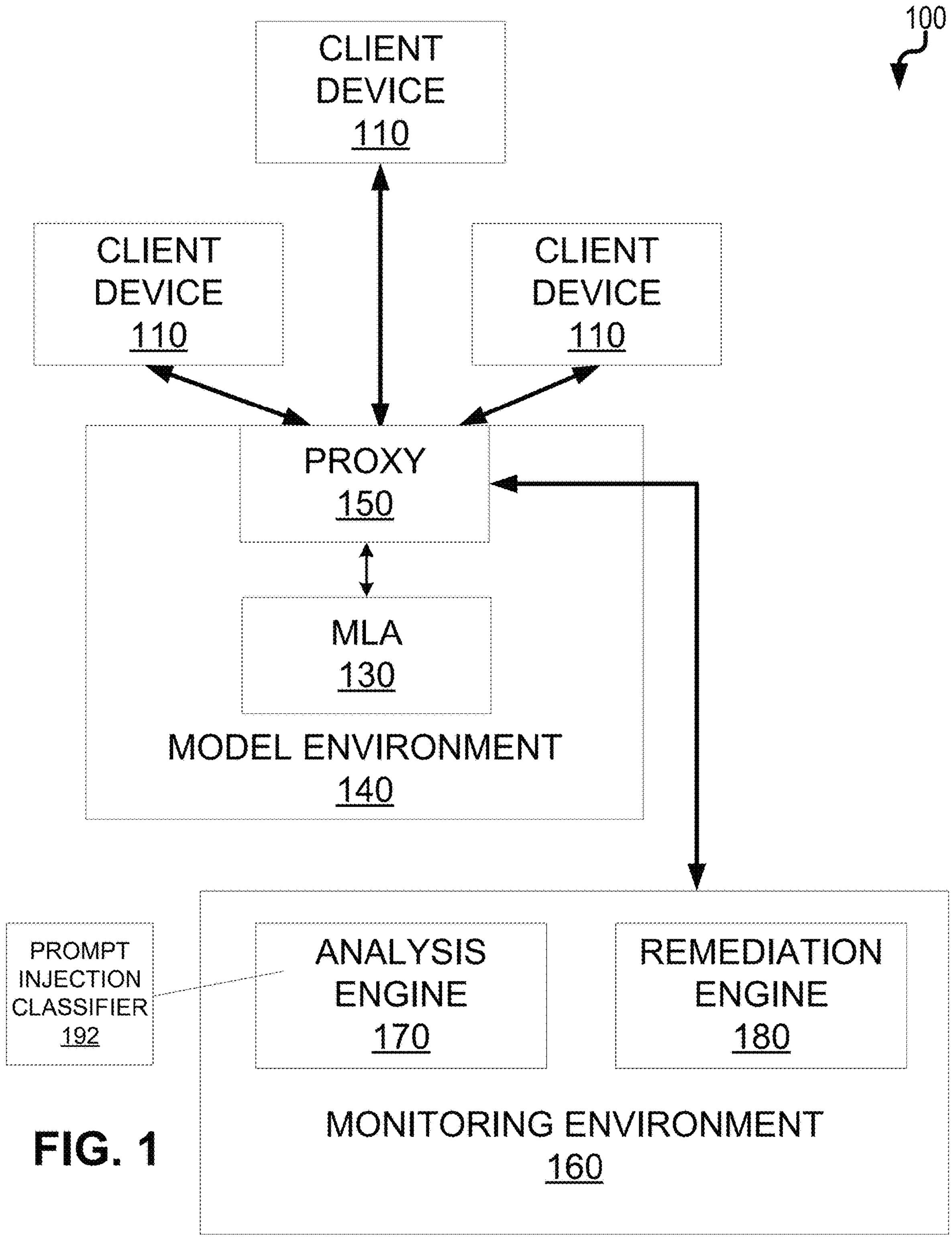
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130.

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
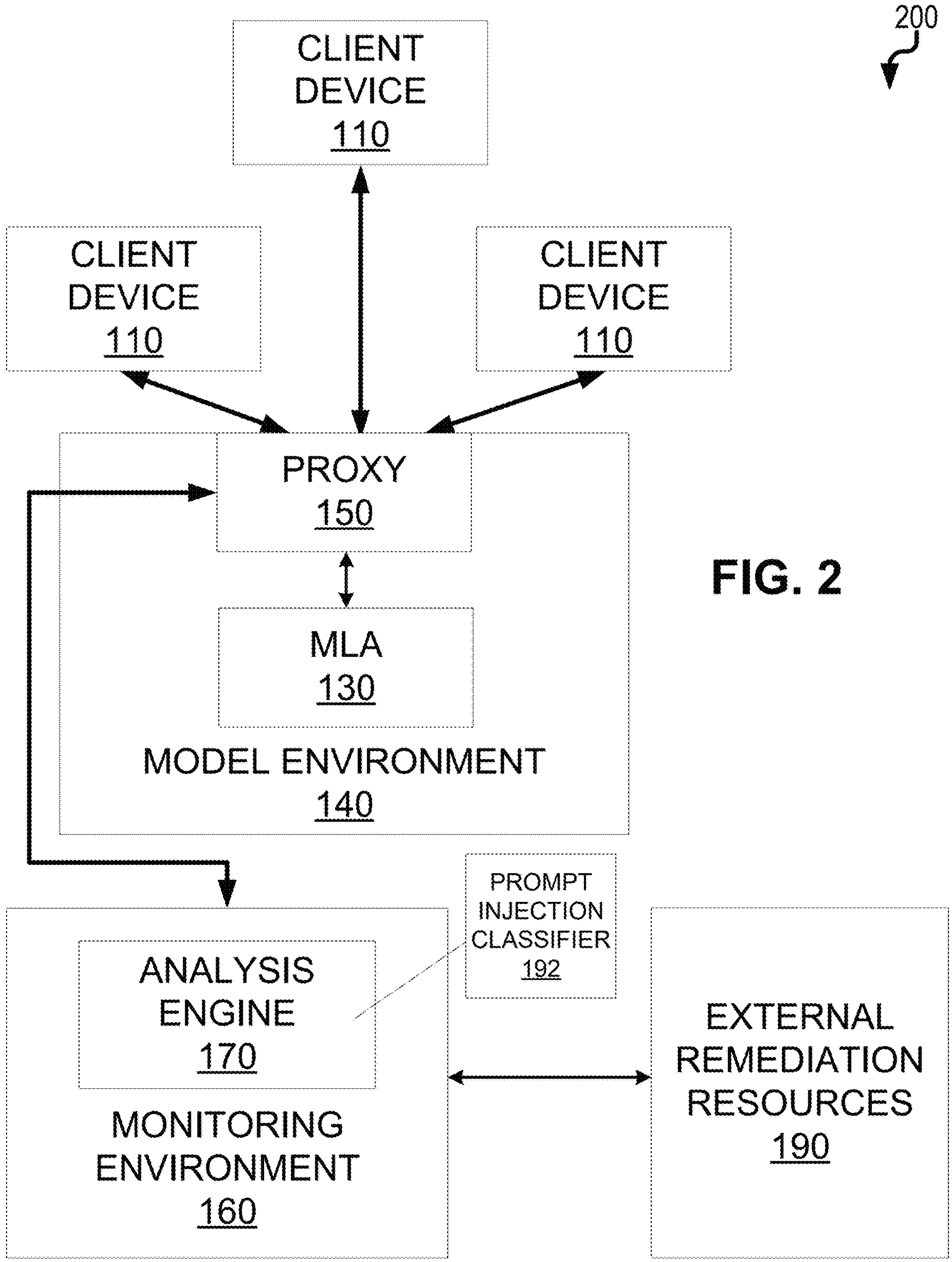
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious. In some cases, a remediation engine 180 which can form part of the monitoring environment 160 (or be external such as illustrated in FIG. 2) can take one or more remediation actions in response to a determination of a query as being malicious. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective.

Figure 3:
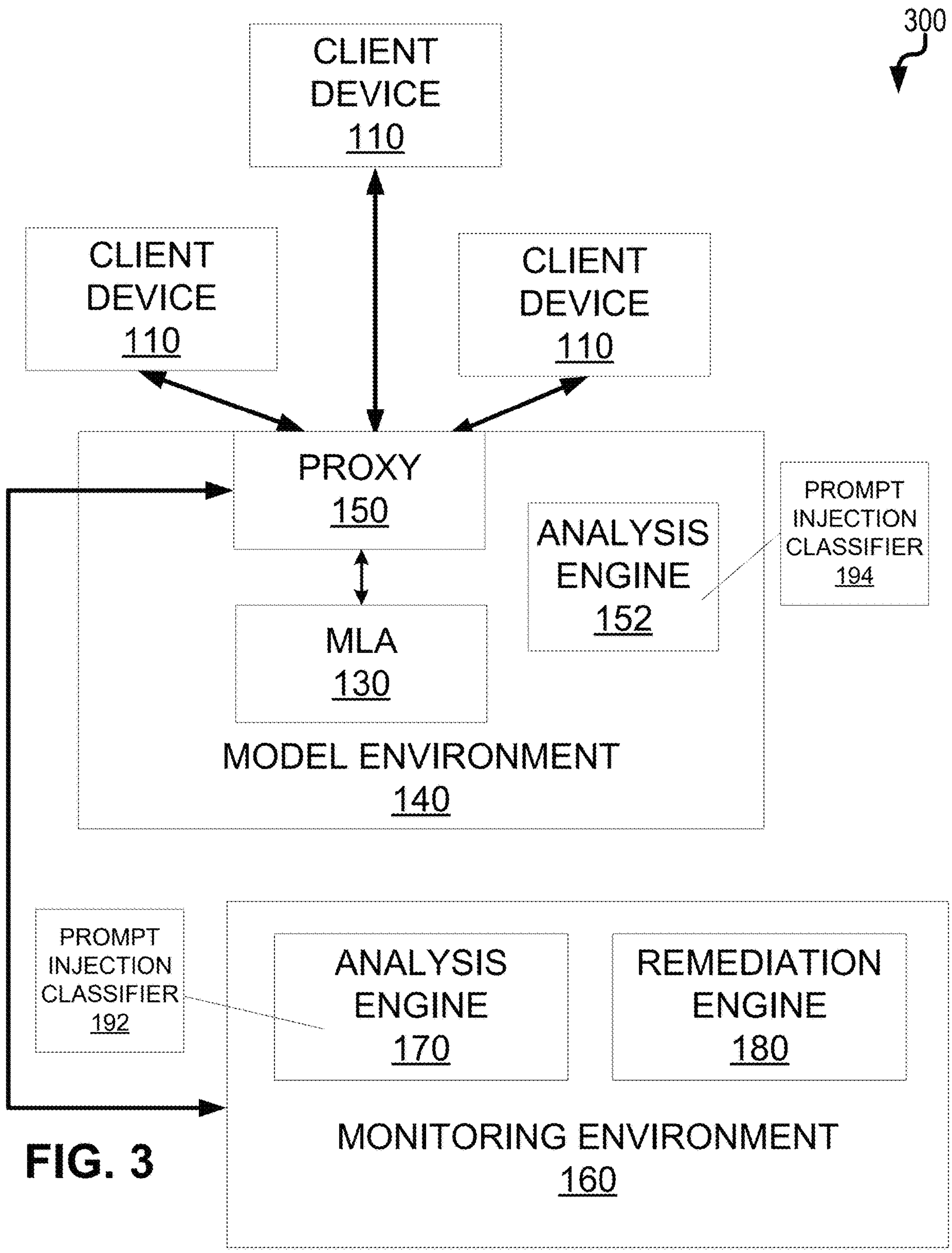
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170.

Figure 4:
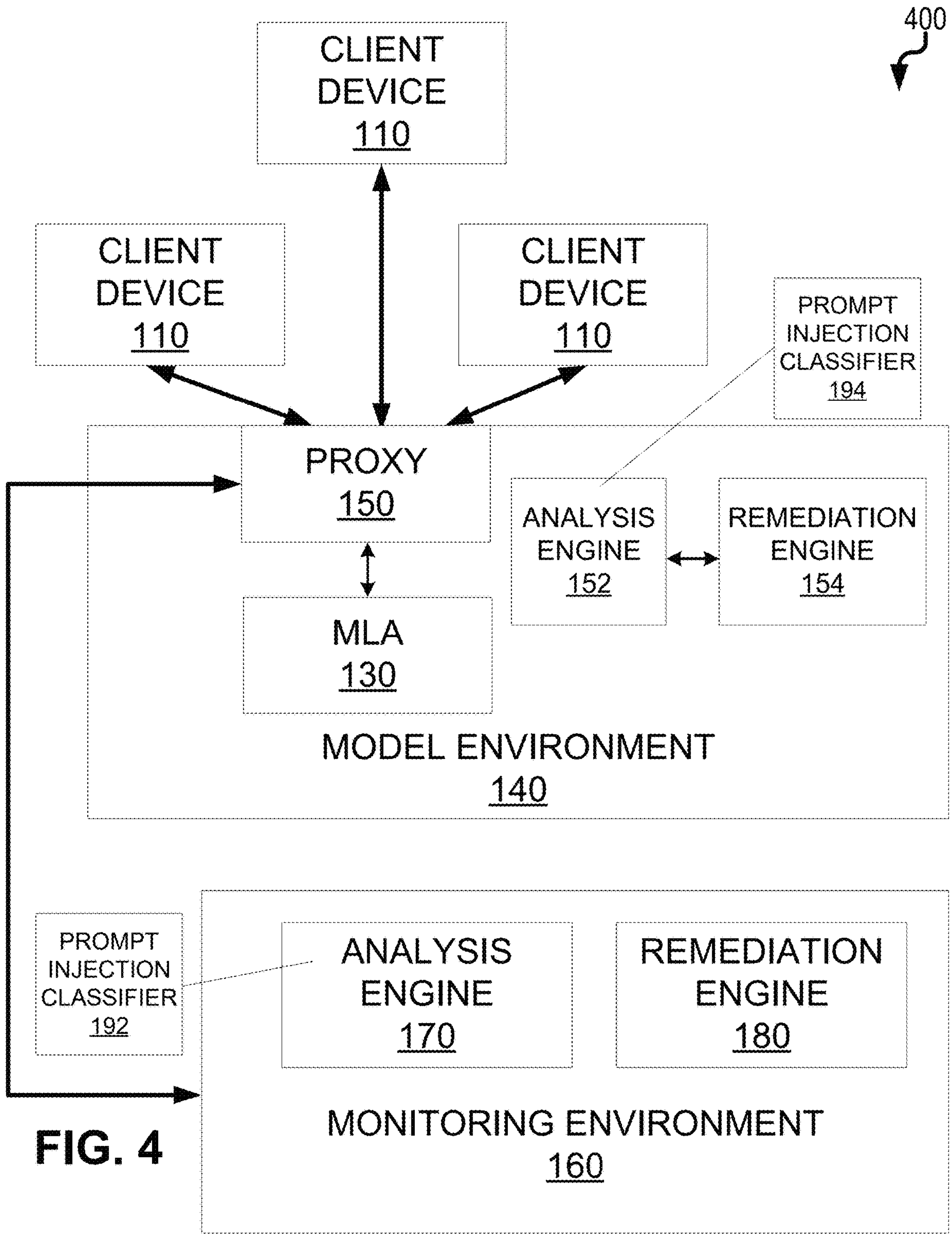
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
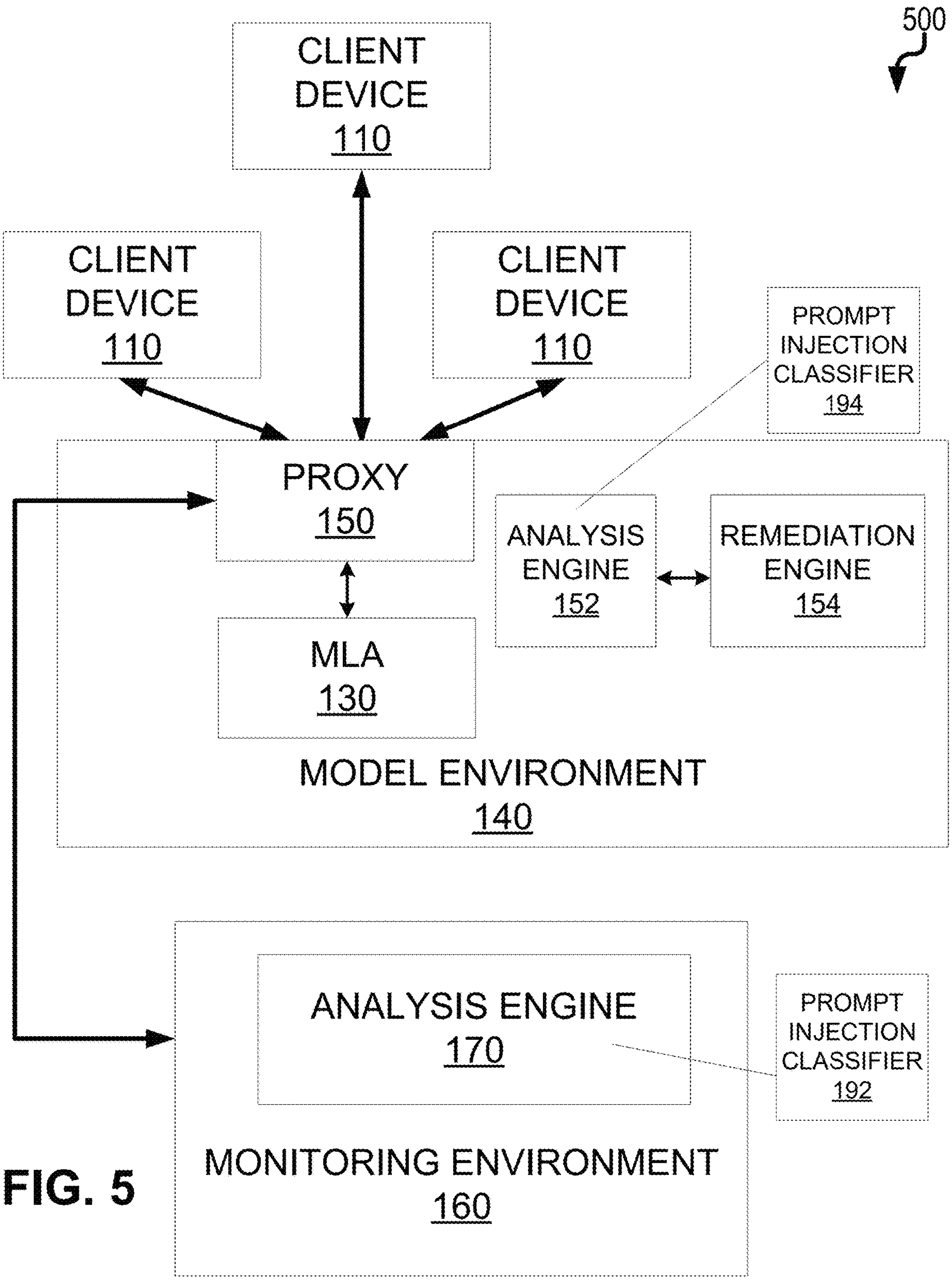
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
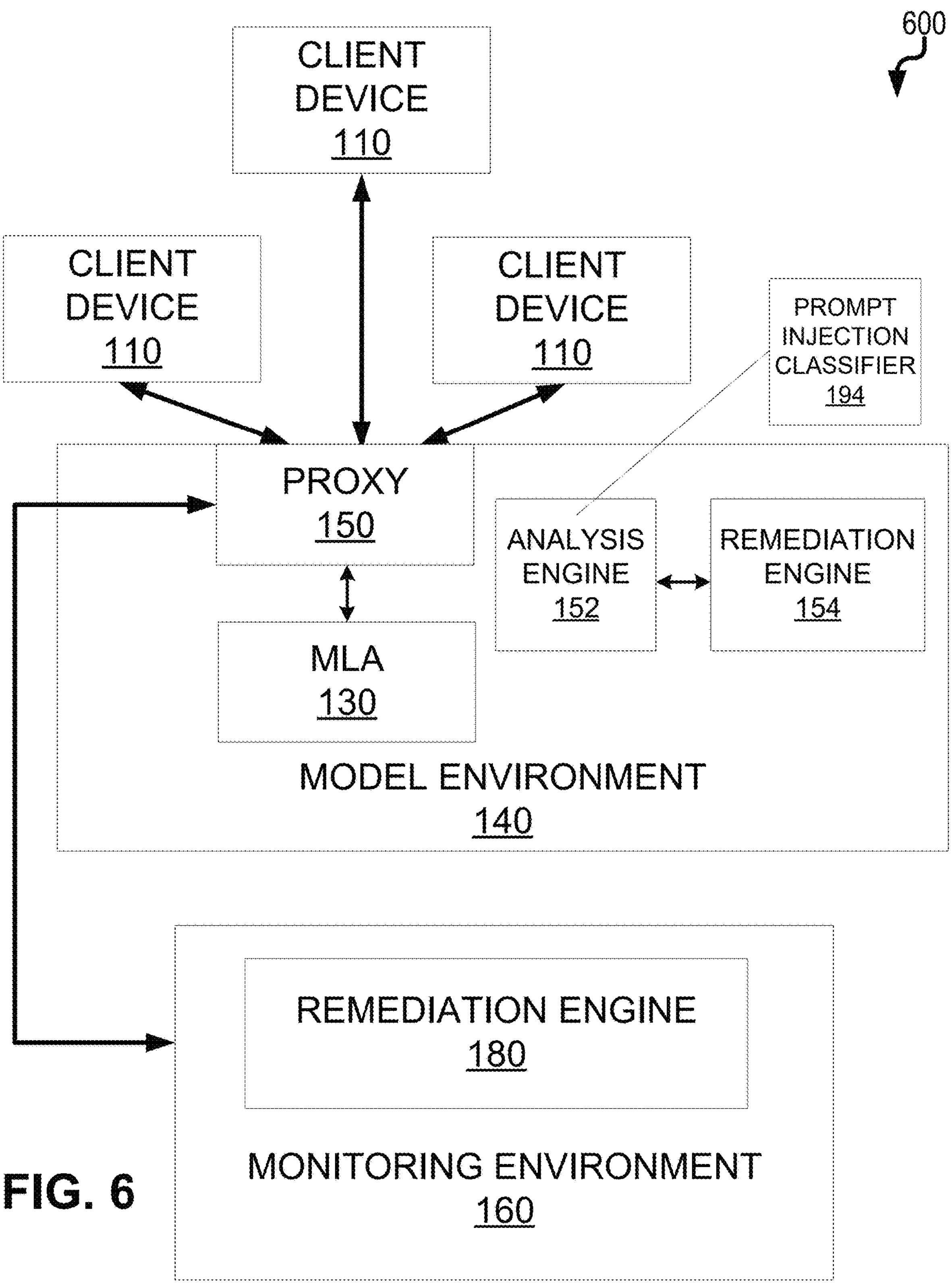
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
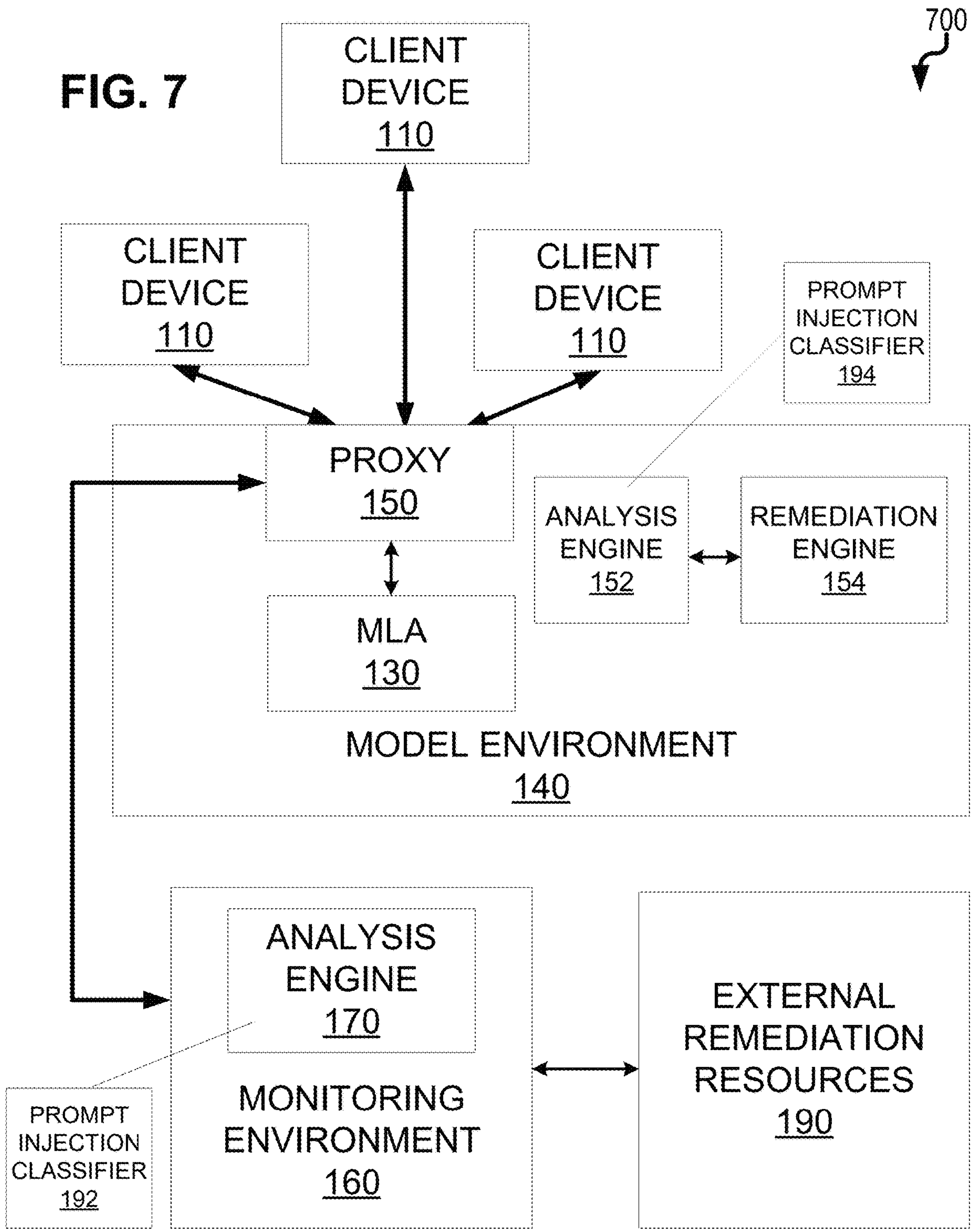
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
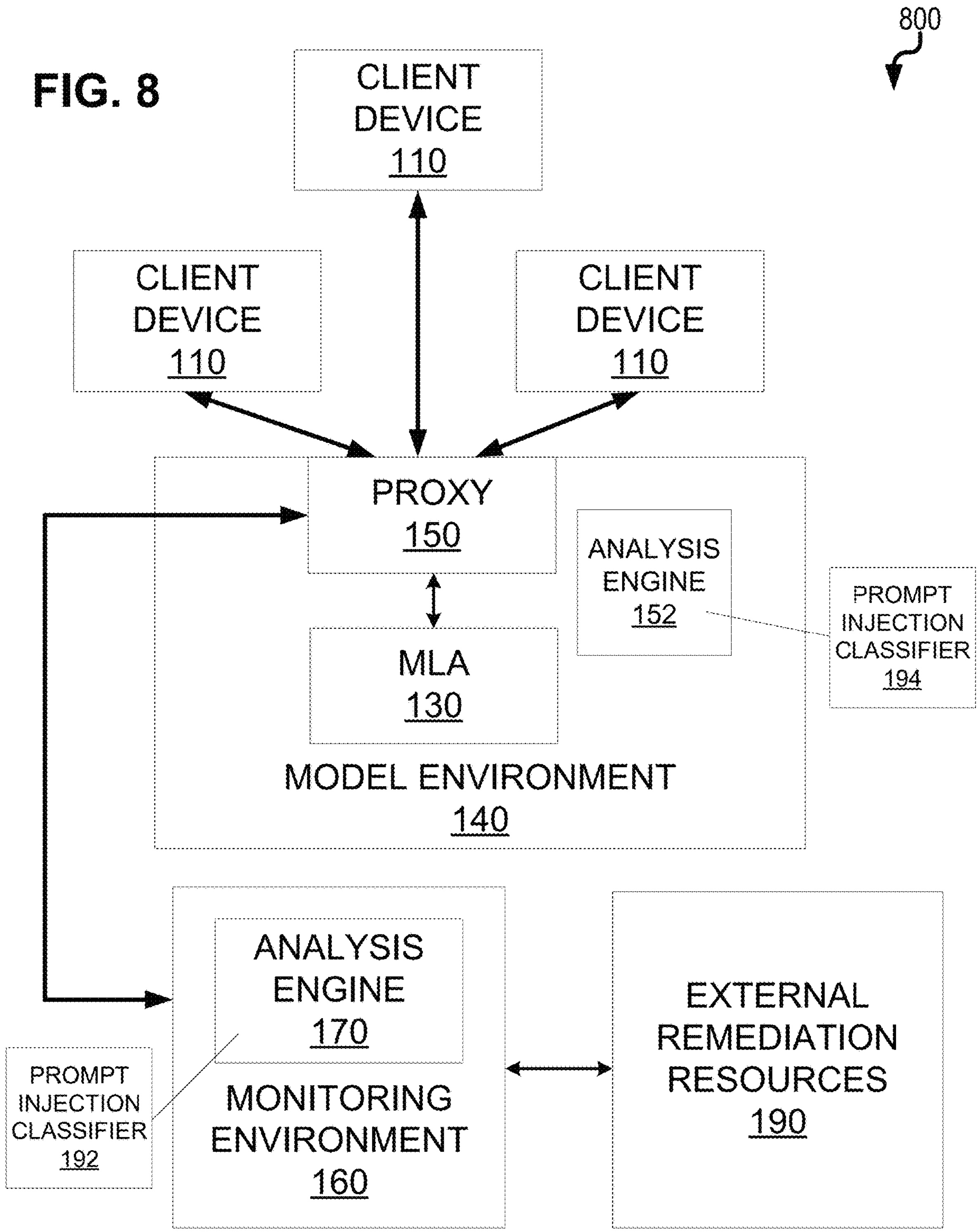
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
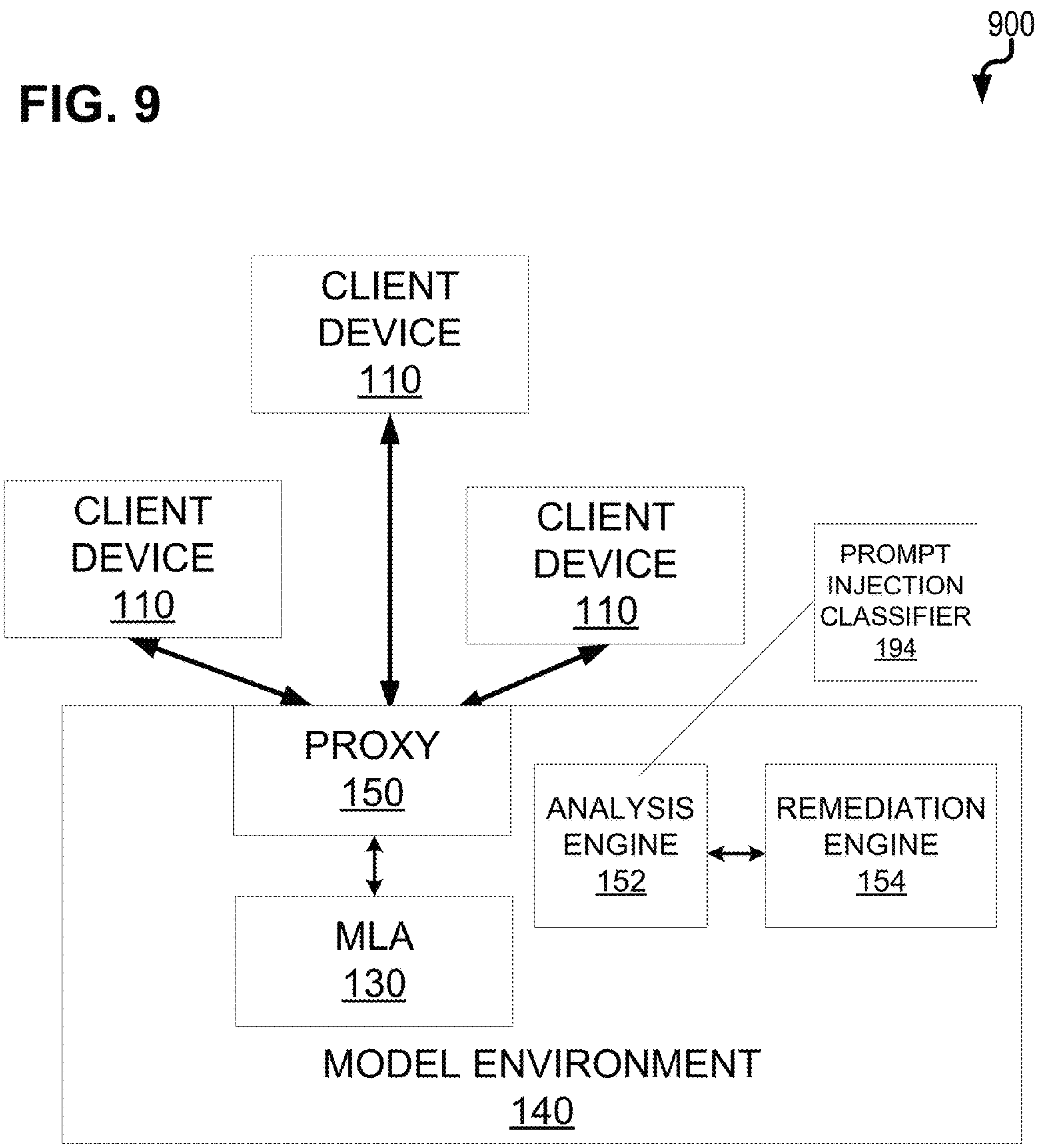
FIG. 9 is a system diagram illustrating a security platform for machine learning model architectures having a model environment having a local analysis engine and remediation engine.

FIG. 9 is a system diagram 900 illustrating a security platform for machine learning model architectures having a model environment 140 has a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
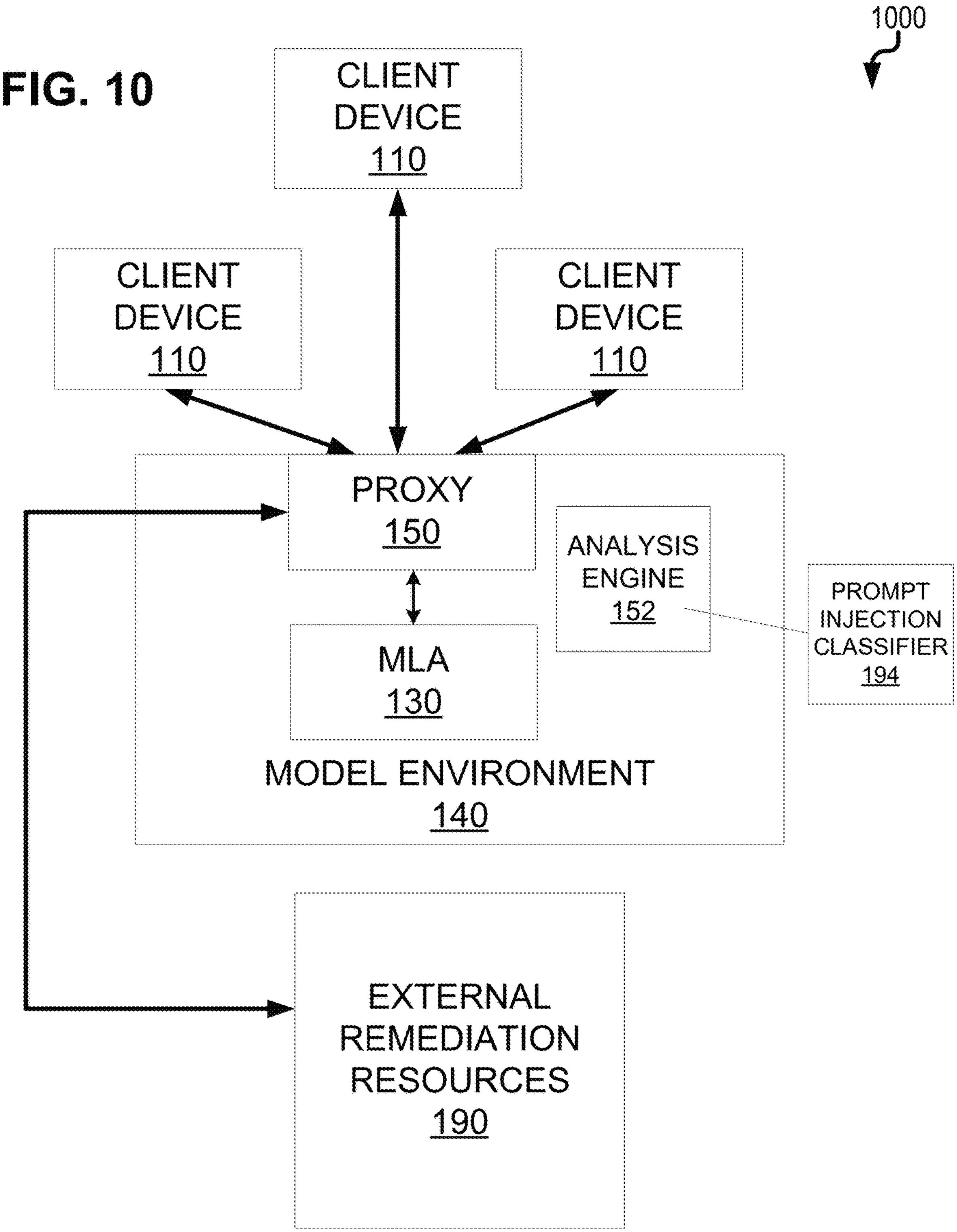
FIG. 10 is a system diagram illustrating a security platform for machine learning model architectures having a model environment having a local analysis engine which interfaces with external remediation resources.

FIG. 10 is a system diagram illustrating a security platform for machine learning model architectures having a model environment 140 including a local analysis engine 152 which interfaces with external remediation resources 190. In this variation, the analysis of inputs/prompts is conducted local within the model environment 140. Actions requiring remediation are then initiated or otherwise triggered by external remediation resources 190 (which may be outside of the monitoring environment 160) such as those described above.

As indicated above, one or more of the analysis engines 152, 170 can include, execute, or otherwise instantiate a prompt injection classifier 192, 194 which, in some variations, is a binary classifier which can identify a prompt as being malicious or benign. In some variations, the prompt injection classifier 192, 194 can be a multi-class classifier which can characterize different aspects of a prompt such as, but not limited to, a level of trustworthiness of the prompt (e.g., malicious, suspicious, benign, etc.). In some variations, the prompt injection classifier 192, 194 can be a multi-class classifier which identifies which of a plurality of different attack types are implicated by an input prompt. Two or more of these prompt injection classifiers 192, 194 can form an ensemble of classifiers (i.e., machine learning models). The ensemble of prompt injection classifiers can be arranged such that two or more of the classifiers are executing in parallel. In other variations, the ensemble of prompt injection classifiers can be arranged such that two or more classifiers are working in sequence. For example, a binary classifier can first analyze a prompt to determine whether the prompt is malicious or benign. If the prompt is classified as being malicious, a multi-class classifier can analyze the prompt to determine a particular type of injection attack. This classification by type can be used to take remediation actions which are specifically tailored to the type of attack. Such an arrangement can also be advantageous when the multi-class classifier is more computationally expensive than the binary classifier (which avoids every prompt being analyzed by the multi-class classifier). Other arrangements can be provided with a lightweight classified being executed by the analysis engine 152 in the model environment 140 and a more computationally expensive model can be executed by the analysis engine 170 in the monitoring environment 160.

The prompt injection classifier 192, 194 can be a machine learning model such as a decoding-enhanced bidirectional encoder representations from transformers with disentangled attention (DeBERTa) model, an XGBoost classification model, a logistic regression model, an XLNet model and the like. In the case of a binary classifier, the prompt injection classifier 192, 194 can be trained using a corpus of data which can include a plurality of benign prompts that do not contain prompt injection information and a plurality of malicious prompts that contain various character strings (which can include portions of alphanumeric symbols, non-printable characters, symbols, controls, etc.) and the like which encapsulate various sorts of prompt injection. Malicious prompts in this context refer to prompts that cause the prompt injection classifier 192, 194 to exhibit undesired behavior. Benign prompts in this context can refer to prompts that do not cause the prompt injection classifier 192, 194 to exhibit undesired behavior. In some variations, the prompts forming part of the corpus can be labeled with their classification. The model training can be performed by converting the prompts into sentence embeddings which can, amongst other features, be used to train the prompt injection classifier 192, 194.

In the case of a multi-class classifier, the training corpus for the prompt injection classifier 192, 194 can include different sets of prompts for each category (i.e., severity level, type of attack, etc.) which are labeled with their category (e.g., security level, type of attack, etc.). The prompts can be transformed into sentence embeddings which can be used, amongst other features, to train the prompt injection classifier 192, 194.

The prompt injection classifier 192, 194 can be periodically retrained as new prompt injection techniques are identified and/or new remediation tools are created. Such an arrangement is advantageous in that the prompt injection classifier 192, 194 can evolve to address the continually changing threat landscape.

After the prompt injection classifier 192, 194 has been trained, the analysis engine 152, 170 can preprocess incoming prompts so that they are suitable for ingestion by the prompt injection classifier 192, 194. For example, the raw/original prompt is transformed into sentence embeddings and then input into the prompt injection classifier 192, 194 which then results in a model prediction. The model prediction for a binary classifier can predict the confidence of the prompt injection classifier. The output of the model can take varying forms including, for example, a score closer to 1 indicating that the prompt is malicious and a score closer to 0 is indicating that the prompt is benign. The model prediction for the multi-class classifiers can identify a category for the prompt (i.e., a class for which the prompt injection classifier 192, 194 has been trained).

The multi-class classifier variation of the prompt injection classifier 192, 194 can be used to identify a type of attack and, in some cases, take remedial actions which are specifically tailored to that type of attack (e.g., an attempt to obtain sensitive information or otherwise manipulate an output of the MLA 130). Example attacks include for which the prompt injection classifier 192, 194 can be trained include, but are not limited to: a direct task deflection attack, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious prompts by injecting special case characters randomly or methodically, to confuse the MLA 130 to output a malicious response. A context continuation attack can include providing the MLA 130 with a single prompt or multiple prompts which follow some permutation of a pattern like: benign prompt, malicious prompt, benign prompt, continuation of malicious prompt and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the prompt and tasking the MLA 130 to decrypt the prompt specifying the encryption method. A text redirection attack can include manipulating or redirecting the flow of text-based communications between users or systems. One or more of the model environment remediation engine 154, the monitoring environment remediation engine 180, or the external remediation resources 190 can take or otherwise initiate remediation activities that are specific to the type of attack and/or based on the severity classification for the prompt (e.g., malicious, highly suspicious, unknown, unable to classify, etc.). One remediation activity can be to block the IP address of the requester (i.e., the computing device initiating or otherwise relaying the prompt/input for ingestions by the MLA 130). In some cases, multiple remediation activities can be utilized such as blocking an IP address in combination with a MAC address or terminating/restarting an HTTP session while also blocking the IP and MAC addresses.

The IP address can also be used to filter (i.e., modify or otherwise redact) prompts before they are input into the MLA 130. The remediation activities can also include generating alerts (e.g., sysadmin alerts) indicating suspicious/malicious prompts. Further, the remediation activities can include capturing system/process behavior associated with suspicious/malicious prompts for analytics or other tracking purposes.

Figure 11:
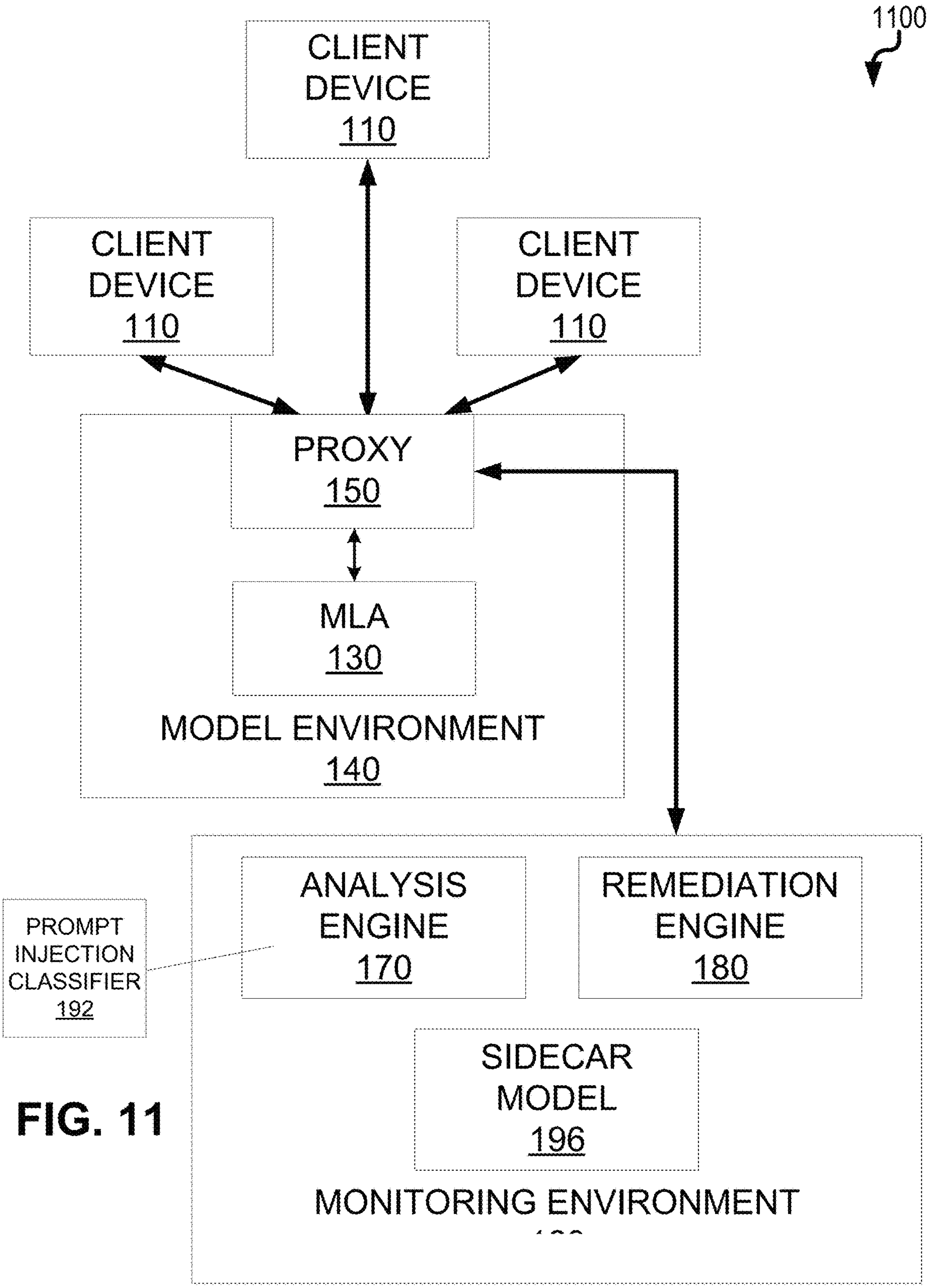
FIG. 11 is a system diagram illustrating a security platform for machine learning model architectures having a sidecar model in a monitoring environment.
Figure 12:
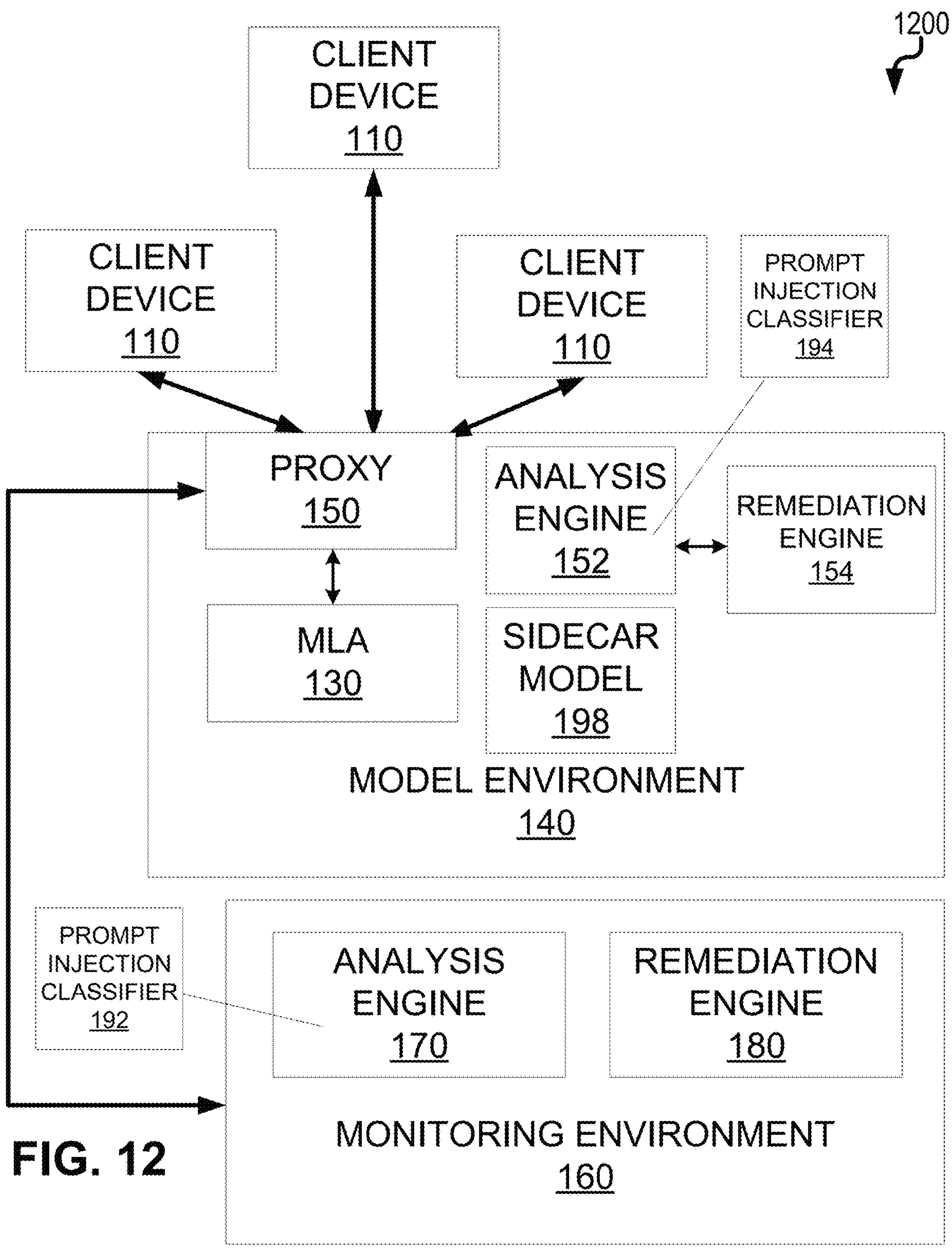
FIG. 12 is a system diagram illustrating a security platform for machine learning model architectures having a sidecar model in a model environment.

With reference to diagrams 1100, 1200 of FIGS. 11-12, in some cases, a sidecar model 196, 198 can be employed. This sidecar model 196 can, as illustrated in FIG. 11, form part of the monitoring environment 160. In addition, or in the alternative, the sidecar model 198 can, as illustrated in FIG. 12, form part of the model environment 140. In other variations, the sidecar model can be part of a different environment (e.g., a different computing system and/or as a service, etc.). Each sidecar model 196, 198 can, in some variations, comprise only a single model. In other cases, the sidecar model 196, 198 can comprise two or more models (e.g., an ensemble of models, models executing in sequence, etc.).

The sidecar model 196, 198 can, in some variations, be a variation of one or more models in the MLA 130. As an example, the sidecar model 196, 198 can be a foundation model with pre-defined guardrails and the MLA 130 can be a fine-tuned version of that foundation model. Fine-tuned, as used in this context, refers to the machine learning process of adapting a pre-trained machine learning model for specific tasks or use cases. The pre-trained model can, for example, include guardrails one or more of the input and output of the model to detect, quantify and mitigate the presence of specific types of risk. As noted above, the process of fine-tuning can, in some cases, change the guardrails associated with the model.

In other variations, the sidecar model 196, 198 can be a model unrelated to the MLA 130 which is aligned. Aligned, in this context, means that the model has guardrails in place which comply with the desired standards of the applicable organization.

Turning again to the variation of FIG. 11, the sidecar model 196 can be resident in the monitoring environment 160. A prompt (or information characterizing the prompt) from one of the client devices 110 is intercepted by the proxy 150 and then routed to the monitoring environment 160. The intercepted prompt is ingested by the sidecar model 196 to see if any of the guardrails associated with the sidecar model 196 are triggered (and in the case of multiple sidecar models a determination can be made as to whether guardrails have been triggered on at least one of the models). If so, the sidecar model 196 can reply with a notification. This notification can take various forms such as a text-based reply to the requesting client device 110 indicating "I'm sorry, but I am unable to assist with that". The output of the sidecar model 196 can be monitored for such notifications. The remediation engine 180 can cause a message to be sent to the proxy 150 including instructions to send the output of the MLA 130 to the requesting client device 110 when no guardrails are triggered. Otherwise, the remediation engine 180 can send a message to the proxy 150 which indicates that the guardrails have been triggered so that the proxy 150 can return a notification to the requesting client device 110. This notification can be the same notification generated by the sidecar model 196 or it can be a different notification as defined by the proxy 150. In other cases, the remediation engine 180 can block the prompt from being input into the MLA 130 and/or block the output of the MLA 130 responsive to the prompt from being sent to the requesting client device 110. Other actions can be initiated by the remediation engine 180 such as those described above.

Turning again to the variation of FIG. 12, the sidecar model 198 can be resident in the model environment 140. A prompt (or information characterizing the prompt) from one of the client devices 110 is intercepted by the proxy 150 and then ingested by the sidecar model 198 to see if any of the guardrails associated with the sidecar model 198 are triggered. If so, the remediation engine 154 can reply with a notification. The output of the sidecar model 198 can be monitored for such notifications. The remediation engine 155 can send a message to the proxy 150 including instructions to send the output of the MLA 130 to the requesting client device 110 when no guardrails are triggered. Otherwise, the remediation engine 154 can send a message to the proxy 150 which indicates that the guardrails have been triggered so that the proxy 150 can return a notification to the requesting client device 110. This notification can be the same notification generated by the sidecar model 198 or it can be a different notification as defined by the proxy 150. In other cases, the remediation engine 154 can block the prompt from being input into the MLA 130 and/or block the output of the MLA 130 responsive to the prompt from being sent to the requesting client device 110. Other actions can be initiated by the remediation engine 154 such as those described above.

Information regarding a prompt that has triggered a guardrail in one of the sidecar models 196, 198 can be logged in order to provide a repository of prompts/inputs that trigger guardrails. This information can be used for lookup purposes and/or to train one or more classifiers so that subsequently received prompts can be processed (e.g., flagged, blocked, modified, etc.). The logged information can include, for example, prompt structure and semantics (vector embeddings, Ngrams, or other information used by other methods to classify similarity).

In some cases, the prompt is not inputted into the MLA 130 until it is confirmed that no guardrails have been triggered in the sidecar model 196, 198. In other variations, the prompt is inputted into the MLA 130 concurrently with inputting such prompt into the sidecar model 196, 198. With this variation, the output of the MLA 130 can be stopped by the remediation engine 154, 180 when the sidecar model 196, 198 indicates that a guardrail has been triggered.

Figure 13:
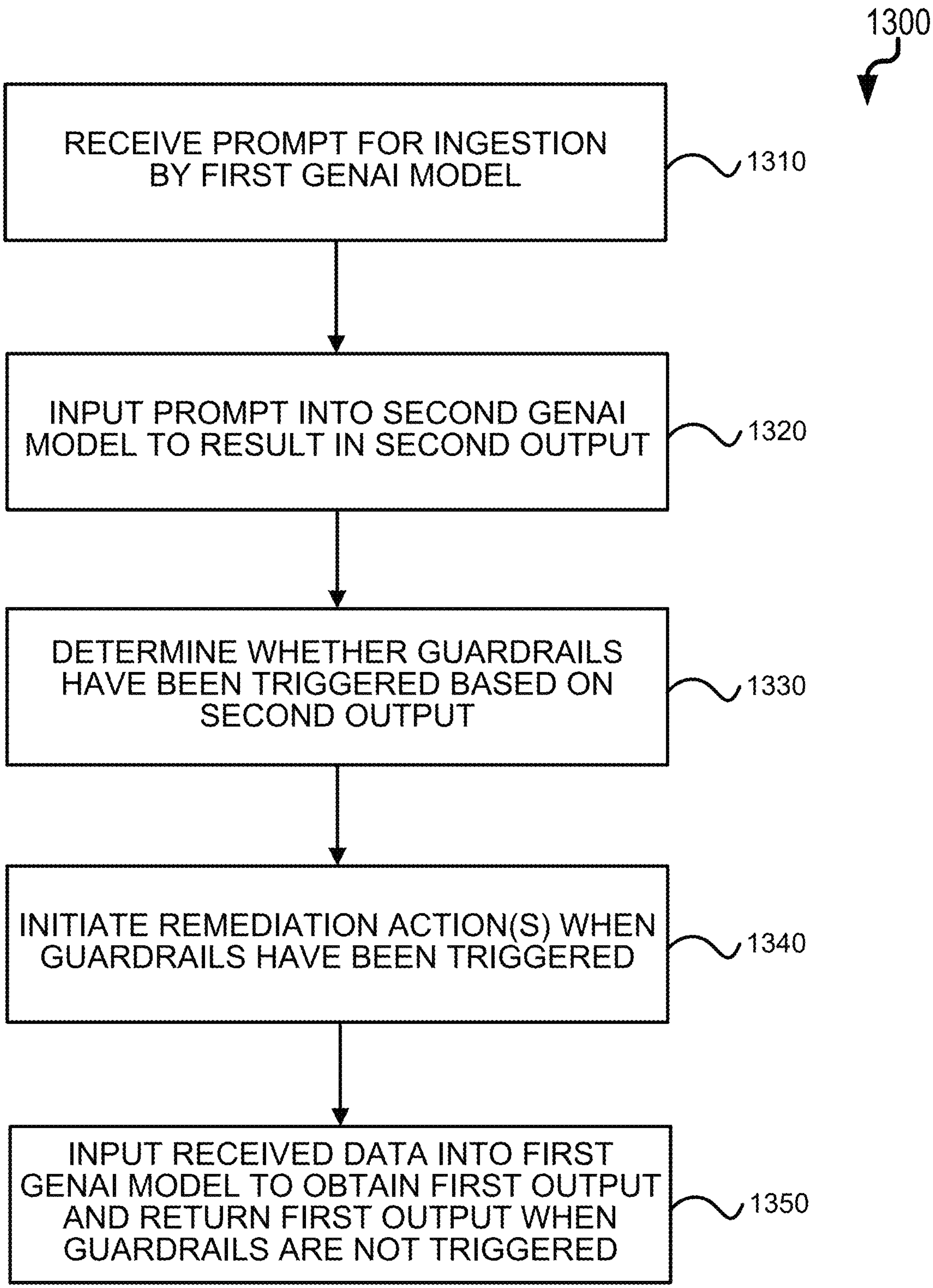
FIG. 13 is a process flow diagram illustrating monitoring inputs of a machine learning architecture using a sidecar model to determine whether a prompt triggers guardrails and requires one or more remediation actions.

FIG. 13 is a diagram 1300 in which data is received, at 1310, from a request which characterizes a prompt for ingestion by the first GenAI model (e.g., MLA 130, a large language model, etc.). The received data is input, at 1320, into a second GenAI model (e.g., a sidecar or sidecar model, etc.) to result in a second output. The first GenAI model is a different version of the second GenAI model. It is later determined, at 1330, whether the second output indicates that guardrails associated with the second GenAI model have been triggered. One or more remediation actions are initiated when is determined that the second output indicates that the guardrails associated with the second GenAI model have been triggered. The received data is input into the first GenAI model when it is determined that the second output indicates that guardrails associated with the second GenAI model have not been triggered to result in a first output. This first output can be returned to the requestor.

Data which characterizes the determination (at 1330) can be provided to a consuming application or process. For example, the analysis engine 152 can provide the determination to the remediation engine 154, the analysis engine 170 can provide the determination to the remediation engine 180, the analysis engine 152 can provide the determination to the remediation engine 180, the analysis engine 170 can provide the determination to the external remediation resources 190, the analysis engine 152 can provide the determination to the external remediation resources 190, and/or the determination can be transmitted to or otherwise consumed by a local or remote application or process. The analysis engine 152, 170 in this context can act as a gatekeeper to the first GenAI model by sending information to a consuming application or process which results in preventing prompts deemed to be malicious from being input and allowing prompts deemed to be safe to be input. In some cases, the consuming application or process flags the prompt as being malicious for quality assurance upon a determination that the prompt comprises malicious content. In some cases, it may be desirable to modify a prompt (which can be performed by the consuming application or process) so that it ultimately is non-malicious. For example, only portions of the prompt may be deemed malicious and such aspects can be deleted or modified prior to ingestion by the GenAI model. Other actions can be taken based on the IP, MAC, and/or session address of the requester (such as blocking the prompt, blocking subsequent prompts, modifying subsequent prompts, etc.). Such an arrangement still provides the attacker with an output/response thereby potentially masking the fact that the system identified the response as being malicious.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

receiving, from a requestor, data characterizing a prompt for ingestion by a first generative artificial intelligence (GenAI) model executing in a model environment;

redirecting the received data from the model environment to a monitoring environment;

inputting the received data into a second GenAI model executing in the model environment to result in a second output;

determining whether the second output indicates that guardrails associated with the second GenAI model have been triggered;

inputting the received data into the first GenAI model when it is determined that the second output indicates that guardrails associated with the second GenAI model have not been triggered to result in a first output and returning the first output to the requestor; and initiating one or more remediation actions when is determined that the second output indicates that the guardrails associated with the second GenAI model have been triggered.

2. The method of claim 1, wherein the data is received from a proxy intercepting inputs to the first GenAI model, the proxy being executed in a model environment of the first GenAI model, the second GenAI model being executed in a monitoring environment separate and distinct from the model environment.

3. The method of claim 1, wherein the initiated one or more remediation actions comprise:

returning the second output to the requestor.

4. The method of claim 1, wherein the initiated one or more remediation actions comprise:

preventing the prompt from being input into the first GenAI model.

5. The method of claim 1, wherein the initiated one or more remediation actions comprise:

flagging the prompt as being malicious for quality assurance.

6. The method of claim 1, wherein the initiated one or more remediation actions comprise:

modifying the prompt to be benign.

7. The method of claim 1, wherein the initiated one or more remediation actions comprise:

blocking an internet protocol (IP) address of the requestor.

8. The method of claim 7, wherein the initiated one or more remediation actions further comprise:

blocking one or more of a media access control (MAC) address or a session identifier of the requester.

9. The method of claim 1, wherein the initiated one or more remediation actions comprise:

causing subsequent prompts from an entity identified by one or more of an internet protocol (IP) address, a media access control (MAC) address, or a session identifier of the requester of the prompt to be modified prior to input into the first GenAI model.

10. The method of claim 1, wherein both of the first GenAI model and the second GenAI model comprise a large language model.

11. The method of claim 1, wherein the first GenAI model is a fine-tuned version of the second GenAI model.

12. The method of claim 1, wherein the first GenAI model is an unaligned model and the second GenAI model is an aligned, unrelated model.

13. A system comprising:

one or more processors; and one or more non-transitory computer-readable media storing instructions that, when executed by the one or more processors, cause the system to perform operations comprising:

receiving, from a requestor, data characterizing a prompt for ingestion by a first generative artificial intelligence (GenAI) model executing in a model environment;

redirecting the received data from the model environment to a monitoring environment;

inputting the received data into a second GenAI model executing in the model environment to result in a second output;

determining whether the second output indicates that guardrails associated with the second GenAI model have been triggered;

inputting the received data into the first GenAI model when it is determined that the second output indicates that guardrails associated with the second GenAI model have not been triggered to result in a first output and returning the first output to the requestor; and initiating one or more remediation actions when it is determined that the second output indicates that the guardrails associated with the second GenAI model have been triggered.

14. The system of claim 13, wherein the data is received from a proxy intercepting inputs to the first GenAI model, the proxy being executed in a model environment of the first GenAI model, the second GenAI model being executed in a monitoring environment separate and distinct from the model environment.

15. The system of claim 13, wherein the initiated one or more remediation actions comprise:

returning the second output to the requestor.

16. The system of claim 13, wherein the initiated one or more remediation actions comprise:

preventing the prompt from being input into the first GenAI model.

17. The system of claim 13, wherein the initiated one or more remediation actions comprise:

flagging the prompt as being malicious for quality assurance.

18. The system of claim 13, wherein the initiated one or more remediation actions comprise:

modifying the prompt to be benign.

19. The system of claim 13, wherein the initiated one or more remediation actions comprise:

blocking an internet protocol (IP) address of the requestor.

20. The system of claim 19, wherein the initiated one or more remediation actions further comprise:

blocking one or more of a media access control (MAC) address or a session identifier of the requester.

21. The system of claim 13, wherein the initiated one or more remediation actions comprise:

causing subsequent prompts from an entity identified by one or more of an internet protocol (IP) address, a media access control (MAC) address, or a session identifier of the requester of the prompt to be modified prior to input into the first GenAI model.

22. The system of claim 13, wherein the first GenAI model is a fine-tuned version of the second GenAI model.

23. The system of claim 13, wherein the first GenAI model is an unaligned model and the second GenAI model is an aligned, unrelated model.

24. A system comprising:

a model environment comprising at least one first data processor and a first physical memory storing a first generative artificial intelligence (GenAI) model, the model environment executing the first GenAI model; and a monitoring environment separate and distinct from the model environment, the monitoring environment comprising at least one second data processor and a second physical memory storing a second GenAI model, the monitoring environment executing the second GenAI model;

wherein the system is configured to perform operations comprising:

receiving, from a requestor, data characterizing a prompt for ingestion by the first GenAI model;

redirecting the received data from the model environment to the monitoring environment;

inputting the received data into the second GenAI model to result in a second output;

determining whether the second output indicates that guardrails associated with the second GenAI model have been triggered;

inputting the received data into the first GenAI model when it is determined that the second output indicates that guardrails associated with the second GenAI model have not been triggered to result in a first output and returning the first output to the requestor; and initiating one or more remediation actions when it is determined that the second output indicates that the guardrails associated with the second GenAI model have been triggered.

* * * * *